United States Patent [19]
Weisend

[11] 3,750,134
[45] July 31, 1973

[54] PLASTIC INJECTION MOLDING MACHINE MONITOR

[75] Inventor: Burke A. Weisend, Longmeadow, Mass.

[73] Assignee: Package Machinery Company, East Longmeadow, Mass.

[22] Filed: Feb. 11, 1971

[21] Appl. No.: 114,426

[52] U.S. Cl. .......... 340/324 A, 340/212, 340/213 Q, 425/145
[51] Int. Cl. ............................................. G08b 5/22
[58] Field of Search ............ 340/324 A, 212, 213 R, 340/213 Q; 425/145

[56] References Cited
UNITED STATES PATENTS

| 3,406,387 | 10/1968 | Werme | 340/324 A |
|---|---|---|---|
| 3,469,252 | 9/1969 | Bet | 340/324 A |
| 3,257,652 | 6/1966 | Foster | 340/213 R |
| 3,204,291 | 9/1965 | McWhorter et al. | 425/145 X |
| 3,001,233 | 9/1961 | Ernst | 425/145 |
| 3,474,438 | 10/1969 | Lauher | 340/324 A |
| 3,248,650 | 4/1966 | Bialkowski et al. | 340/324 A X |

Primary Examiner—David L. Trafton
Attorney—McCormick, Paulding & Huber

[57] ABSTRACT

A monitoring system for a plastic injection molding machine adapted to measure the temperature and pressure of the material being plasticized and injected and to determine the position of the machine ram at any selected point in time in the machine cycle. The system employs sensors for the aforesaid measurements and determinations which are connected in electrical circuitry adapted to compare the sensed information with selected and adjustable upper and lower limits and to provide an alarm signal when the limits are crossed. An oscilloscopic display unit is employed to provide a visual comparison of sensed machine information with the said limits when desired.

12 Claims, 3 Drawing Figures

PLASTIC INJECTION MOLDING MACHINE MONITOR

BACKGROUND OF THE INVENTION

The invention resides in the field of plastic injection molding and it relates to a monitoring system which is especially adapted to a machine for plastic injection molding.

A well-known plastic injection molding machine utilizes a rotatable and axially reciprocable screw in a heated barrel so that this screw provides a means for plasticizing a thermoplastic raw material, and it also constitutes a ram for injecting the plasticized material. The material is, of course, injected through a nozzle connected at the end of the barrel into a cavity defined between mold halves which are relatively movable and which are closed and opened in timed relationship to the operation of the combined plasticizing screw and ram. In a cylce of operation of such machine, starting when the die halves are opened to release a finished product from the cavity, the nozzle opening is closed and the screw is rotated to plasticize the raw material and to advance it toward the nozzle end of the barrel. The plasticized material is extruded over the nozzle end of the screw under very considerable pressure which forces the screw-ram rearwardly in the barrel to a selected point which is determined by the volume of the plasticized material at the nozzle end of the screw being sufficient to fill the cavity.

In the meantime, the mold halves will have been closed to define the cavity, and when the predetermined point of screw retraction is reached, the screw-ram is thrust forwardly as the nozzle aperture is opened to inject the plasticized material into the cavity. (At this point it should be mentioned that while the following description may refer to a valve for opening and closing the nozzle, such valve may not be required. That is, flow through the nozzle may be controlled automatically in cycling the machine without a valve by keeping the nozzle engaged with a closed and filled mold until the injection stroke of the ram is started or is about to start.) After injection, the mold halves remain closed for a sufficient time to permit the plasticized material to take a set, and the mold halves are again opened and the cycle is repeated.

The quality of the product produced is determined to a large extent by the temperature and pressure of the plasticized material being injected and by the speed or position of the ram at a point in time during a machine cycle. If these material and machine operating parameters are closely controlled and held within desired limits, the molding machine can be operated at high production rates with a minimum of waste due to rejection of the finished product for poor quality. As far as is presently known, the injection molding machines used in mass production are not continuously monitored in such manner that the aforesaid qualitative parameters are under continuous observation for a selected sweep time cycle so that a check can be made on performance as to any selected parameter at a selected point in time during such cycle.

SUMMARY OF THE INVENTION

In keeping with the present invention, a monitoring system is provided which employs at least one sensor on the machine for each of the temperature, pressure and ram position parameters. Each sensor is connected into an individual powered electrical circuitry complex to generate a signal or rather a series of signals responsive to the measured temperature, position, or pressure over a period of time which may embrace the entire cycle time or only a portion thereof. The generated signal voltage thus constitute a trace of the measured parameter for the selected period of time. The circuitry complex associated with each sensor also includes means for selecting and providing an upper limit signal voltage and a lower limit signal voltage at a selected period of time during the trace. The complex also includes additional circuit means for comparing the upper and lower signal voltages with the trace voltage at the selected point in time and for generating a signal output if the trace voltage exceeds the upper limit signal voltage or falls below the lower limit signal voltage.

The monitor system provided by this invention also contemplates the use of an oscilloscopic display unit which can be connected with all of the simultaneously operating parameter signal complexes and can be operated to display traces of all parameters simultaneously, but which is preferably operated to display the trace of only one parameter against its associated and selected upper and lower limit points at the selected period of time.

DESCRIPTION OF THE PREFERRED EMBODIMENT

Figure 1:
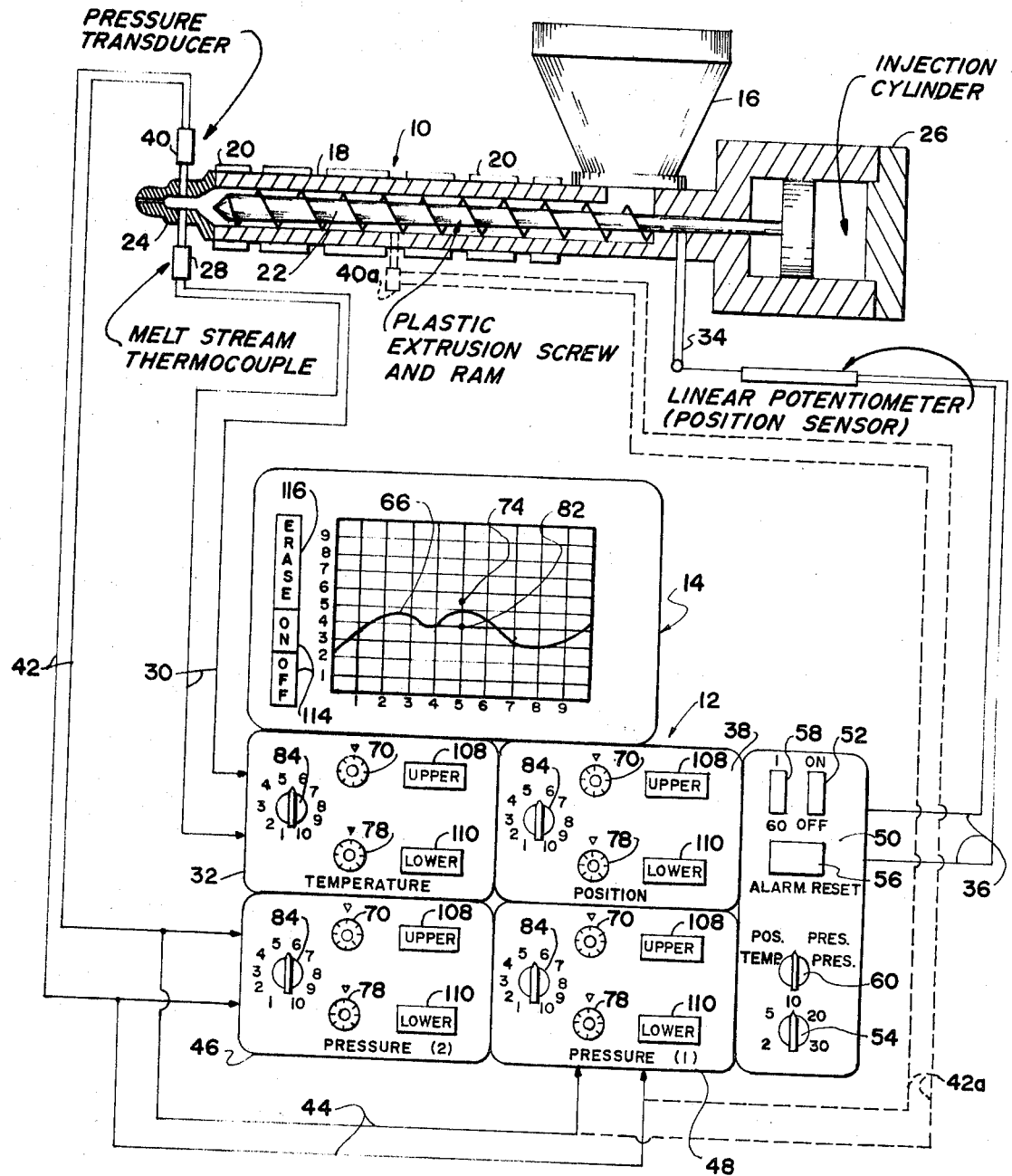
FIG. 1 comprises a schematic illustration of the barrel portion of a plastic injection molding machine and a monitor system associated therewith in accordance with the present invention.

In FIG. 1, the portion of the injection molding machine shown is indicated generally by the referance number 10, the monitor or monitor cabinet is indicated generally by the reference number 12 and the oscilloscope display unit is designated generally by the reference 14.

The portion of the injection molding machine 10 which is shown includes a hopper 16 located over a barrel 18 to feed the raw material to the bored interior of the barrel.

The thermoplastic raw material is generally supplied in a particulate form to be plasticized as a "melt" within the barrel as it moves from right to left therein. Plasticizing of the raw material is caused by heat which is applied to the barrel through heating bands 20, 20 which surround the barrel in a longitudinally extending series. Plasticizing is further caused by rotation of a combination screw and ram 22 which is rotated by means not shown to advance the material from right to left in the barrel toward a nozzle 24 connected to the lefthand end of the barrel. Thus, as the raw material is worked and advanced by rotation of the screw, all of the while being subjected to heat, it becomes more plastic and constitutes a melt when it reaches the nozzle 24 beyond the left-hand end of the screw.

The nozzle, of course, communicates with a cavity defined between closed but relatively movable mold halves (not shown). During the time that the material is being plasticized and moved into the nozzle but before injection into the mold cavity, the opening in the nozzle 24 is closed by a suitable valve. The nozzle being closed, the plasticized material or melt is thrust into the nozzle area under very substantial pressure, and this forces the rotating but reciprocable screw-ram 22 rearwardly or toward the right as viewed in FIG. 1. When a sufficient volume of the melt is present in the left-hand end of the barrel and beyond the left-hand end of the screw to fill the mold cavity, the rearwardly moving screw will trip a limit switch (not shown) which controls the screw-ram operation. That is, when the limit switch is tripped, the screw will cease to rotate, and hydraulic fluid in the ram injection cyclinder 26 will be built up to ram pressure to thrust the screw-ram forwardly or toward the left at the time the nozzle aperture is opened to inject the collected shot or charge of the melt into the mold cavity. The charge is, of course, injected at a very high pressure into the mold.

In operation of the injection molding machine in the manufacture of at least some products it is desirable to have two stages of pressure. That is, it is desirable to commence the filling of the cavity under an extremely high pressure to assure rapid and complete flow into the cavity, and then to reduce the pressure when the cavity is filled or substantially filled to avoid the possibility of the mold halves being separated by the pressure force of the material being injected. This is generally accomplished by the use of a timed pressure relief valve (not shown).

During any operation of the machine in the manufacture of any product, it is desirable to monitor and to control the temperature of the material and its pressure during the single stage or during the first and second stages and to monitor the ram position at a point in time and thus its speed. Such monitoring is accomplished according to the present invention by the use of sensors, each of which is associated with the machine 10 and with a unit or section in the monitor cabinet 12. More specifically, there is a temperature sensor 28 connected by conductors 30, 30 to a temperature monitor unit 32; a position sensor 34 connected by conductors 36, 36 with a position monitor unit 38; a pressure sensor 40 connected by conductors 42, 42 and by conductors 44, 44 with second and first stage pressure monitor units 46 and 48, respectively. The temperature sensor 28 preferably comprises a thermocouple, the position sensor 34 is preferably a linear potentiometer, and the pressure sensor 40 is preferably a strain gage transducer. This same transducer can be used as the sensor for the first stage pressure measurement during the timed first stage pressure interval by its connection with the unit 48 and to measure the second stage pressure during its timed interval by its connection with the unit 46. However, if desired, an additional strain gage transducer 40a can be connected by conductors 42a, 42a to the unit 48 to monitor first stage pressure, and the unit 48 can be utilized in association with either transducer 40 or 40a to monitor pressure if but a single stage of pressure is used in operation of the machine 10.

Figure 3:
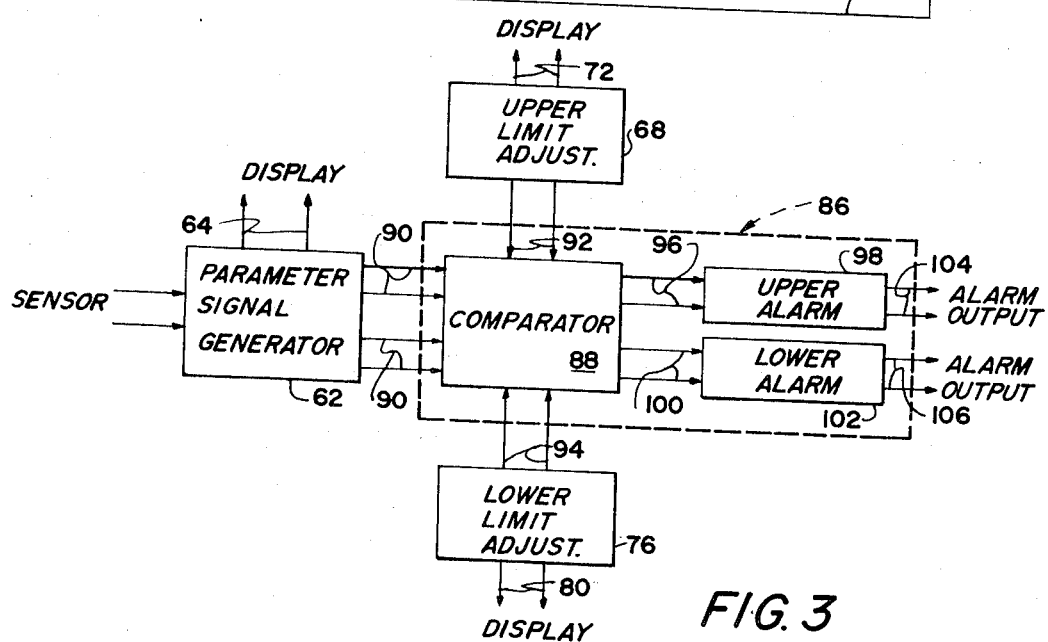
FIG. 3 comprises a block wiring diagram of a circuitry complex utilized in the monitor.

Each of the monitor units 32, 38, 46 and 48 in the monitor cabinet 12 includes a powered electrical circuitry complex as shown schematically in block diagram in FIG. 3. All of the said units are adapted to operate simultaneously, if desired. That is, the temperature unit 32, the position unit 38 and at least one pressure unit 46 or 48 will be operated simultaneously, and both the pressure units can be operated at the same time by utilizing the pressure transducer 40a with the pressure unit 48 while utilizing the transducer 40 with the pressure unit 46, and in such event the conductors 44, 44 will be eliminated. A common switch control panel 50 for each of the said monitor units is provided as a part of the monitor cabinet 12.

The control switches on the panel 50 include an on-off switch 52, a trace time selector switch 54, and an alarm reset switch 56 which operate to control all of the individual monitor units simultaneously. The panel 50 also includes a cycle selector switch 58 and a parameter selector switch 60 which are used primarily in control of the display unit 14. The on-off switch 52 controls the power input to each of the four monitor units, and when the switch is "on" power is supplied to the electrical circuitry complex of each units as shown in FIGS. 3. The trace cycle time selector switch 54 can be placed in any one of five positions to provide a trace cycle time selection of 2 seconds, 5 seconds, 10 seconds, 20 seconds or 30 seconds. The trace cycle will start at the same at the same point in each cycle of machine operation, for example, with the closing of the mold halves, so that depending upon the time selected at the switch 54 the trace cycle time will embrace at least a portion of the complete machine cycle time or the entire machine cycle time. In effect, such cycle time selection determines the length of the time period for the complete $x$ axis or abscissa coordinate of the display screen on the oscilloscopic display unit 14. The alarm reset 56 de-energizes all of the alarm circuits in the four monitor units when depressed by an operator. The cycle selector switch 58 can be operated to display one trace cycle of the selected parameter on the display unit screen or 60 such cycles of the selected parameter. The selector switch 60 selects which parameter of the units 32, 38, 46 and 48 is to be displayed on the oscilloscope 14.

As mentioned above, all of the four monitor units comprise the same circuitry complex, and since the said complex may be any one of a plurality of circuit and subcircuit combinations within the general electric and electronic art, the details of which form no part of the present invention, the complex has been shown in block diagram form in FIG. 3. The circuitry complex for each of the four monitor units includes a first circuit means or subcircuit 62 in which the conductors from the sensor associated with the particular monitor unit is connected. This first circuit means 62 may be characterized as a parameter signal trace generator. That is, it is powered and adapted to provide or generate signal voltages responsive to the parameter measurement taken by its associated sensor over the period of time selected for a cycle trace at the switch means 54. These signal voltages are transmitted to the display unit through lines 64, 64 to provide a trace 66 on the screen of the monitor 14 which is calibrated to display the time selected for the trace along the $x$ axis in 10 equal units and the voltage or scope of displayed signals along the $y$ axis in 10 equal units or calibrations.

The circuitry complex also includes a second circuit means or subcircuit 68 which is powered and adapted to provide an upper limit signal voltage for display on the screen of the display unit 14. That is, a multi-position selector switch or dial 70 on the face of each monitor unit (FIG. 1) can be set to a selected upper limit voltage in the second circuit means 68 which is transmitted to the display unit 14 through the lines 72, 72 to the monitor 14 wherein such selected upper limit voltage is displayed as a dot or point 74 on the screen of the display unit. Similarly, a third circuit means or subcircuit 76 is powered and adapted to provide a lower limit signal voltage which may be selected by manipulation of the dial 78 on the face of its monitor unit to select a lower limit signal voltage which is transmitted to the display unit 14 by the lead lines 80, 80, this signal voltage appearing on the screen of the display unit 14 as an illuminated point 82.

It will be noted by reference to FIG. 1 that the upper limit point 74 and the lower limit point 82 are located in the middle of the x axis sweep of the trace signal 66. This location or timing for the limit signal voltages is selected in each unit of the four monitor units independently of the others by a 10 place selector switch 84. The 10 places for each selector switch are numbered from one to 10, and when the number five is selected as shown, the upper and lower signal voltages will be generated by the second and third circuit means 68 and 76 halfway through the selected time interval along the x axis for the trace 66. If a selector switch 84 is set on another point, the upper and lower signal voltages will be generated at a different point in time during the trace cycle. For example, if the selector switch is placed on point "2," the upper and lower signal voltages will be generated and pulsed when twenty percent of the time selected at the switch 54 for the signal trace has elapsed. If a selector switch 84 is placed at point "6," the upper and lower signal voltages will be generated and pulsed when 60 percent of the selected time has elapsed.

Figure 2:
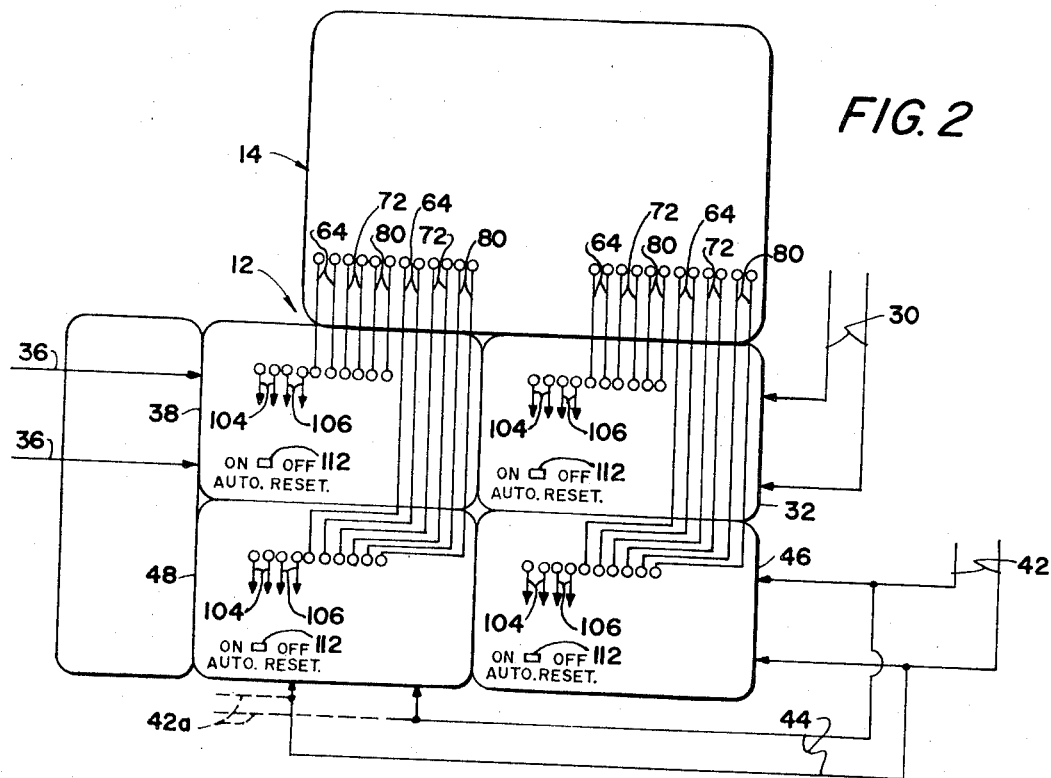
FIG. 2 is a rear view of the monitor illustrated in FIG. 1.

The circuitry complex shown in FIG. 3 also includes an additional circuit means indicated generally by the reference number 86 to compare the voltage of the trace 66 at the point in time selected for the upper and lower limit signals 74 and 82 and to provide an alarm signal output in the event the trace signal voltage exceeds the selected upper limit voltage or falls below the selected lower limit voltage. More specifically, this additional circuitry 86 comprises a comparator subcircuit 88 connected as by leads 90, 90 with the first trace signal generating subcircuit 62 and it is connected by leads 92, 92 with the second circuit means generating the upper limit voltage signal, and by leads 94, 94 with the third circuit means 76 generating the lower limit voltage. This comparator subcircuit 88 compares the trace signal voltage with the upper and lower limit voltages and transmits a comparison signal by leads 96, 96 to an upper limit alarm subcircuit 98 and by leads 100, 100 to a lower limit alarm subcircuit 102. If the trace signal exceeds the upper limit voltage selected by the selector 70 and displayed at the point 74, the upper limit alarm will generate an alarm signal output at the signal output lines 104, 104. If the trace signal falls below the voltage selected at the selector 78 and displayed at the point 82 on the display screen of the unit 14, the lower alarm subcircuit 102 will provide an alarm output signal at the lines 106, 106. Whenever an alarm signal appears on the leads 104, 104, the upper limit alarm subcircuit 98 also energizes an alarm lamp 108 on the front face of the unit and whenever an alarm signal appears on the leads 106, the lower limit alarm subcircuit 102 energizes a lamp 110 on the face of the unit. The alarm signals on the leads 104 and 106 can be utilized to energize an audible alarm or to operate a feedback control to correct machine operation. For example, if the parameter being sensed is temperature and the temperature at the selected time exceeds the selected upper limit, the alarm signal can be used in feedback control equipment to reduce the temperature by reducing the heat at the heating bands, or some of them, 20. Likewise, if the temperature is lower than desired, the alarm signal on the leads 106 can be used in feedback structure to increase temperature. The alarm lamps 108 or 110 will remain lighted until the alarm is reset or the condition corrected. The alarm can be reset by depressing the alarm reset switch 56 on the panel 50. Each unit is also preferably provided with an automatic alarm reset 112 located on the back of each monitor unit. In FIG. 2, the automatic reset switches for all units are shown in the "off" position, but when the automatic reset is "on," the alarm circuitry will be automatically reset after a predetermined time period so that the alarm signals will not continue to be generated as a result of the trace signal voltage exceeding or falling below the selected limits.

The display unit 14 comprises a conventional oscilloscope device such as a Tektronix type 601 monitor oscilloscope. Such oscilloscope has the capability of storing trace signals up to sixty cycles as selected at the switch 58 for display. That is, if desired, the trace signal of one or 60 cycles showing the selected parameter will be displayed on the screen of the unit 14. Thereafter, the trace will automatically erase so that a new series will start with the next trace cycle. The oscilloscope 14 has its own on-off switch 114 and it has a manually operable erase switch 116 which can be used to erase a trace at any time desired.

The display unit 14 is not essential to operation of the monitor system. That is, the display unit is connected to the four monitor units as illustrated schematically in FIGS. 2 and 3 merely for the purpose of providing an operator with a visual comparison of the trace signal with the selected limit voltages. The monitor, when disconnected from the oscilloscope 14, will continue to operate and to provide the alarm when called for. In the meantime, the oscilloscopic display unit 14 can be disconnected from the monitor cabinet 12 and moved to another monitor cabinet wherein its units are connected to a different injection molding machine.

I claim:

1. A monitor system for a plastic injection molding machine having means for plasticizing a material subjected to heat and a reciprocating ram for injecting it into a cavity defined between mold halves which are closed and opened during a cycle of machine operation, the said system comprising a sensor associated with the machine to measure and be responsive to at least one parameter of the group consisting of ram position, material temperature and material pressure and connected in first circuit means for generating trace signal voltages responsive to measurement of the parameter over a time period taken for at least a portion of a machine cycle, said first circuit means being included in a powered electrical circuitry complex which also includes individually adjustable second and third circuit means for selecting and producing upper and lower signal voltages, respectively, at a selected point in time during generation of said trace, and additional circuit means for comparing said upper and lower signal voltages with the trace signal voltage at the selected point in time and for providing an alarm signal output in the event the trace signal voltage exceeds or falls below the respective upper and lower signal voltages at the selected point in time.

2. A monitor system as defined in claim 1 wherein said second and third circuit means are limited in their capability for producing upper and lower signal voltages to the same selected point in time for comparison with the trace signal voltage.

3. A monitor system as set forth in claim 1 wherein there are a plurality of the said sensors, each responsive to one of said parameters; and at least an equal plurality of powered electrical circuitry complexes, each associated with one of said sensors; and wherein all such complexes may operate simultaneously, each with the capability of producing its individual alarm signal output.

4. A monitor system as set forth in claim 1 wherein there are a plurality of the said sensors, each responsive to one of said parameters; an at least equal plurality of powered electrical circuitry complexes, each associated with one of said sensors and each having means for selecting the length of time period during which its first circuit means generates trace signal voltages; and wherein all such complexes may operate simultaneously, each with the capability of producing it individual alarm signal output.

5. A monitor system as set forth in claim 1 wherein there are a plurality of the said sensors, each responsive to one of said parameters; an at least equal plurality of powered electrical circuitry complexes, each associated with one of said sensors and each having means for selecting the length of time period during which its first circuit means generates trace signal voltages and each having its second and third circuit means limited in capability for producing upper and lower signal voltages to the same selected point in time for comparison with its trace signal voltage.

6. A monitor system as in claim 1 wherein the molding machine is operated to provide two stages of pressure, a first timed stage and a second timed stage thereafter, and wherein one said sensor is provided to measure and be responsive to pressure, the said sensor being connected in said first circuit means included in each of two of said circuitry complexes operable, respectively, during said first and second timed stages.

7. A monitor system as set forth in claim 1 wherein there are a plurality of the said sensors, each responsive to one of said parameters; an at least equal plurality of powered electrical circuitry complexes, each associated with one of said sensors; and wherein the ram position sensor comprises a linear resistance potentiometer, the temperature sensor comprises a thermocouple, and the pressure sensor comprises a strain gage transducer.

8. A monitor system for a plastic injection molding machine having means for plasticizing a material subjected to heat and a reciprocating ram for injecting it into a cavity defined between mold halves which are closed and opened during a cycle of machine operation, the said system comprising a sensor associated with the machine to measure and be responsive to at least one parameter of the group consisting of ram position, material temperature and material pressure and connected in first circuit means for generating trace signal voltages responsive to measurement of the parameter over a time period taken for at least a portion of a machine cycle, said first circuit means being included in a powered electrical circuitry complex which also includes individually adjustable second and third circuit means for selecting and producing upper and lower signal voltages, respectively, at a selected point in time during generation of said trace, additional circuit means for comparing said upper and lower signal voltages with the trace signal voltage at the selected point in time and for producing an alarm signal output in the event the trace signal voltage exceeds or falls below the respective upper and lower signal voltages, and a display unit connected with said circuitry complex to provide a display of said trace and said upper and lower signal voltages for visual comparison.

9. The monitor system of claim 8 wherein the said display unit is oscilloscopic and has a storage capability and the circuitry complex includes selector means for displaying one or a plurality of cycle traces for comparison with said upper and lower signal voltages.

10. The monitor system as defined in claim 8 wherein there are a plurality of the said sensors; each responsive to one of said parameters; an at least equal plurality of the powered circuitry complexes, each associated with one of said sensors and all said complexes being operable simultaneously; and wherein said display unit is oscilloscopic and is connected with all of said complexes, the connection including means for selecting individual complexes for display of their traces with their associated upper and lower signal voltages.

11. The monitor system as set forth in claim 8 wherein there are a plurality of the said sensors; each responsive to one of said parameters; an at least equal plurality of the powered circuitry complexes, each associated with one of said sensors and all said complexes being operable simultaneously; and wherein said display unit is oscilloscopic and is connected with all of said complexes, the connection including means for selecting individual complexes for display of their traces with their associated upper and lower signal voltages and for selecting the length of the time period during which the first circuit means of the selected complex generates trace signal voltages.

12. The monitor system of claim 8 wherein there are a plurality of the said sensors; each responsive to one of said parameters; an at least equal plurality of the powered circuitry complexes, each associated with one of said sensors and all said complexes being operable simultaneously but each being independent of the other in selecting and adjusting its upper and lower signal voltages and the point in time for such upper and lower signal voltages; and wherein said display unit is oscilloscopic and is connected with all of said complexes, the connection including means for selecting individual complexes for display of their traces with associated upper and lower signal voltages and for selecting the length of the time period during which the first circuit means of the selected complex generates trace signal voltages.

* * * * *